United States Patent [19]

Tovagliaro

[11] Patent Number: 4,714,094

[45] Date of Patent: Dec. 22, 1987

[54] GAS-OIL PRESSURE ACCUMULATOR

[75] Inventor: Constantino Tovagliaro, Milan, Italy

[73] Assignee: Magnaghi Oleodinamica S.p.A., Milan, Italy

[21] Appl. No.: 867,339

[22] Filed: May 23, 1986

[30] Foreign Application Priority Data

May 30, 1985 [IT] Italy ............................... 20963 A/85

[51] Int. Cl.[4] .......................... F16L 55/04; B65D 8/08

[52] U.S. Cl. ........................................ 138/31; 220/414

[58] Field of Search .................... 138/30, 31, 143, 144, 138/15.3, DIG. 2; 156/170, 172, 173, 175; 220/3, 83, 414, DIG. 23

[56] References Cited

U.S. PATENT DOCUMENTS 3,171,563 3/1965 Bernd ...................................... 220/3

4,561,568 12/1985 Hoffmeister et al. ........... 220/414 X

*Primary Examiner*—Henry J. Recla

*Assistant Examiner*—Mark J. Thronson

*Attorney, Agent, or Firm*—Karl F. Ross; Herbert Dubno

[57] ABSTRACT

A gas-oil pressure accumulator having a load-bearing structure of composite material, suitable for aircraft hydraulic circuits. The accumulator is formed of a cylindrical body with closed ends, at least one of which is composed of a convex cap. A piston slideable in the cylindrical body defines two chambers, one adapted for containing hydraulic oil and the other adapted for containing gas under pressure. The walls subjected to internal pressure are formed with an internal core of metallic material of small thickness, and are provided with a facing of composite material, composed of high-strength fibres impregnated with synthetic resin, adapted for resisting the loads due to the pressure, which facing of composite material extends at least over one of the end caps of the cylindrical body, the winding of the fibers being continuous and without the superposition of consecutive turns in any one layer of turns, with winding angles differing from the angles corresponding to the equilibrium path of the stresses on the surface of the cylindrical body itself.

4 Claims, 3 Drawing Figures

GAS-OIL PRESSURE ACCUMULATOR

FIELD OF THE INVENTION

This invention relates to gas-oil pressure accumulators.

BACKGROUND OF THE INVENTION

In the construction of equipment and components for aircraft, there is a fundamental requirement for guaranteed maximum safety and reliability, together with the greatest possible lightness.

In on-board hydraulic systems intended for supplying numerous essential service devices, such as for example servocontrols, brakes, undercarriages and so on, pressure accumulators are components of particular importance.

These accumulators have the function of containing a volume of hydraulic oil kept under pressure by a pressurized gas for supplying a sufficient quantity of oil, even in the case of failure of the compressor installation or of a portion of the supply circuit, to permit essential items of equipment for emergency flight operations to be actuated.

In many designs it has been noted that the accumulators are the components which carry the greatest weight penalty in said hydraulic installations. This is due to the design standards, which impose a fairly high factor of structural safety, and to the particular service loadings for which the accumulators must be designed.

In order to reduce the weight of these components, it is possible to have recourse to steels possessing high structural strength values, but these materials do not provide sufficient fatigue strength and wear resistance, are difficult and expensive to machine, and moreover lead to only moderate reductions in weight.

It is also possible to use material of a composite type, but such materials with the known manufacturing techniques, do not lend themselves to the construction of complicated and asymmetrical forms, as required in accumulators.

OBJECT OF THE INVENTION

An object therefore of the present invention is to provide an accumulator with adequate strength and at the same time a low weight.

SUMMARY OF THE INVENTION

According to the invention there is provided a gas-oil pressure accumulator having a load-resistant structure of composite materials, comprising a cylindrical body having closeable ends, at least one of which is formed as a convex cap, a piston slideable in said cylinder to define two chambers, one chamber being arranged to contain hydraulic oil and the other chamber being arranged to contain gas under pressure, in which the walls of the structure to be subjected to internal pressure comprise an internal core of a thin metallic material, provided with an envelope of composite material of high-strength fiber impregnated with synthetic resin, the envelope being arranged to resist the loadings caused by the pressure, which envelope of composite material extends at least over at least part of one of the end caps of the cylindrical body, the fibers being wound continuously and without the superposition of consecutive turns in any one layer of turns, with winding angles departing from the angles corresponding to a winding angle which would balance the stresses on the surface of the cylindrical body itself.

One embodiment of a pressure accumulator according to the present invention possesses an internal core of metallic material, preferably steel, equipped with a rear base fixed to same and carrying the fittings for the hydraulic connection, with an intermediate cylindrical portion within which a piston is slideably and sealingly mounted, and a front closed cap, there being provided over said core an envelope of composite material, resisting all or a part of the pressure load, comprising the intermediate cylindrical portion and extending through a part of the front cap, the metallic core being of reduced thickness in the zones in which the composite material envelope is present.

In greater detail, said composite material envelope possesses a principal layer of fiber following a helical path on the surface of its said cylindrical portion, of variable pitch, and a secondary layer of fiber following a circumferential path and having a thickness which decreases from the junction zone between said cap and said cylindrical portion to the end zone of said envelope of composite material on the cylindrical portion.

In particular, the principal layer possesses fiber making an angle substantially of 55° with the generatrices of said cylindrical portion in the junction zone with said cap and an angle near to 90° in its end zone; the envelope of composite material extends on said cap to a minimum diameter equal to 0.8 times the diameter of said cylindrical portion.

The fibers of composite material are fibres having a high modulus of elasticity and preferably are carbon fibers.

In another embodiment of the invention, the cylindrical body contains an internal lining tube of metallic material, inside which the piston can slide, and has an external wall separated from the lining tube and having an internal metallic core, connected at one end to a base carrying the fittings for the hydraulic connection of the accumulator, possessing an intermediate cylindrical portion and forming, at the opposite end, a closure cap, the connection zone of the metallic internal core of the external wall to the base having a diameter less than the diameter of its intermediate cylindrical portion and being connected to same by a convex cap, the internal core of the external wall being clad in a layer of composite material, which resists the totality of its pressure loading, and being of reduced thickness throughout the area in which it is coupled to said composite material.

The envelope of composite material extends over the closure cap down to a minimum diameter equal to 0.6 of the diameter of the composite material at the opposite end and the fibers of the composite material make an angle with the generatrices of the cylindrical surface of the external wall, in the zone of connection with with closure cap, substantially less than 55°.

The metallic core can have a convex transition cap between its cylindrical portion and the junction zone of said base, and said envelope of composite material extends over said convex cap down to a diameter substantially equal to 0.8 times the diameter of said cylindrical portion. The material of said internal metallic core is favourably a light alloy, possessing in its intermediate cylindrical portion the minimum thickness compatible with its machinability.

In this embodiment, the fibers of composite material are preferably fibers of aramide resin (aromatic polyamide), known by the commercial name of "Kevlar".

In general, the impregnation resin for the fibers of the composite material is preferably an epoxy resin.

BRIEF DESCRIPTION OF THE DRAWING

The invention will now be described by way of example with reference to the accompanying drawing, in which.

SPECIFIC DESCRIPTION

Figure 1:
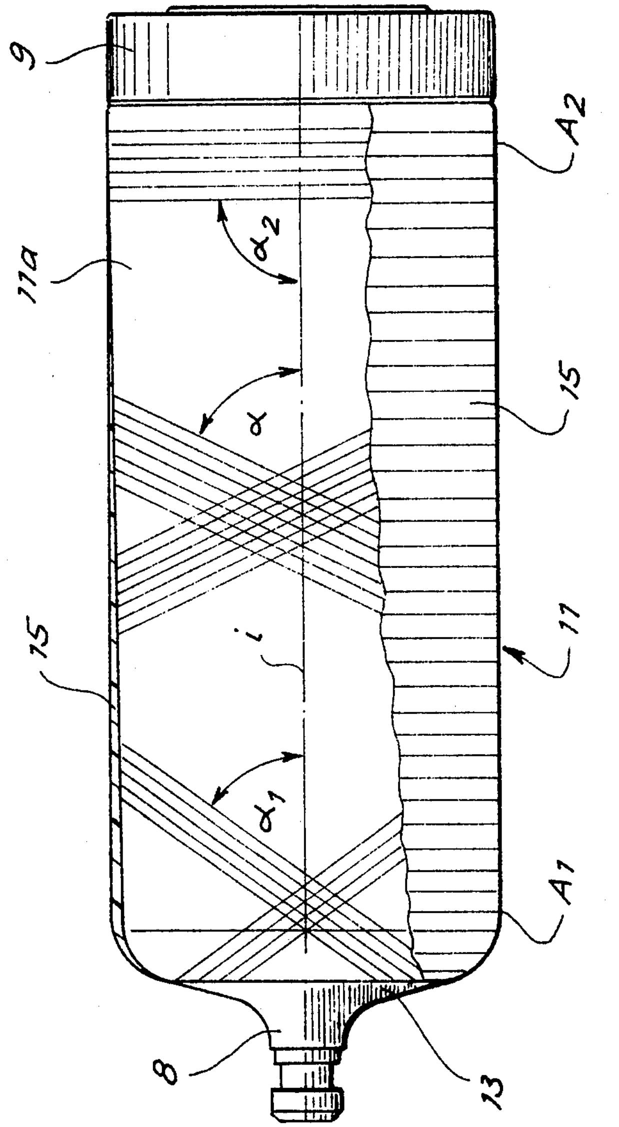
FIG. 1 is an external elevational view of one embodiment of a single-cylinder accumulator according to the invention with external wall and end cap, constructed of metallic material coupled to composite material.
Figure 2:
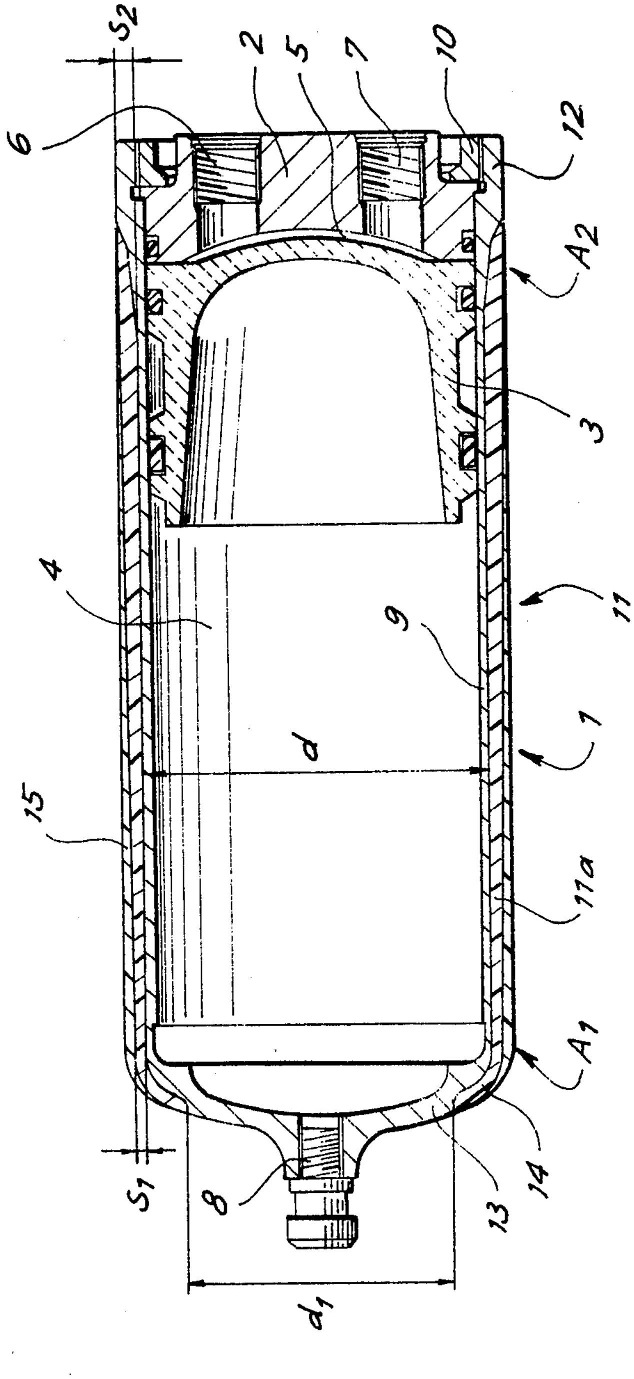
FIG. 2 is an axial view in section of the accumulator of FIG. 1.

As shown in FIGS. 1 and 2, an accumulator comprises a cylindrical body 1, having an end, or base, 2, inside which a piston 3 is slideably mounted to define inside the cylindrical body 1 two chambers 4, 5, intended to contain pressurized gas and oil respectively.

The base 2 is provided with inlet and outlet ducts 6, 7 for the feed and discharge of oil and the chamber 4 has a closeable coupling 8, for the initial charge of gas under pressure.

The cylindrical body 1 comprises a lining or internal core of steel 9, which slideably receives the piston 3, the core being secured to the base 2 by means of a threaded ring 10.

The cylindrical body 1 is subjected to the loadings, or static forces, caused by internal pressure. An external envelope 11 for the lining 9 is constructed of composite material, and imparts, in conjunction with the internal lining 9, the necessary structural strength to the assembly, at the same time reducing its weight to a minimum.

The lining 9 is so dimensioned as to withstand the main part of the loadings only in the axial direction, and possesses and end, or rear, portion 12 having an increased thickness for connection of the base 2 and the ring 10 and possesses at the other end a front cap 13, which carries the coupling 8. Resistance to radial loadings is provided by the composite material envelope 11, which is called upon also to resist a portion of the axial forces.

A curved portion 14 of the composite material envelope 11 extends over a portion of the front cap 13 and said portion 14 is subjected to a part of the thrust due to the pressure acting upon the cap 13, in association with the cap 13 of the core 9. The thrust is converted into a loading, or force, in the composite material envelope 11 having a direction parallel to the axis of the cylindrical body 1.

The composite material envelope 11 comprises fibers having a high tensile strength, arranged in directions adapted to exploit in an optimum manner their strength properties and impregnated and locked to the lining 9 by synthetic resins.

The fibers most suitable for this purpose are fibers having a high modulus of elasticity, so as to obtain congruent deformations between the composite material and the steel lining under the loadings applied to them; fibers suitable for this purpose are, for example, carbon fibers.

The layout of the fibers must satisfy many requirements, including the balancing of the longitudinal (axial) and transverse (circumferential) stresses and the arranging of continuous fibres so as to follow the profile of a winding surface which is not—as required by the known theory of winding threads—symmetrical, the curved-in portion 14 being present at one end, whereas at the other end the composite material terminates in a cylindrical portion of the surface.

It is therefore necessary that the composite material not only resist the load in the radial direction (circumferential stresses) and a portion of the axial load, but also must transmit, at its end, its share of the axial load to the internal metallic core.

This is rendered possible by the arrangement of the filaments along non-geodetic lines on the surface of the core. If the fibers were oriented solely along geodetic lines they would be subjected to pure tensile stresses. However, by disposing them along paths different from the geodeteic ones, they can withstand shear stresses, these stresses being transmitted to the impregnating resin. In this way, the fibers can support a portion of the axial loading, even when the structure of the composite material is not symmetrical, by progressively transferring the loads to the internal metal core through the resin. For this purpose, the fibers of the main layer 11*a* are arranged to make an angle $\alpha_1$ appropriately of 55° with the corresponding generatrix "i" of the cylindrical body, in the zone designated A1, near to the junction with the portion 14, which angle corresponds to that required to balance the axial and circumferential stresses on the cylindrical body.

Said angle, generally referenced $\alpha$, increases progressively to a value $\alpha_2$, which is substantially 90° in the terminal zone A2 of the composite material reinforcement, in which it is no longer called upon to resist axial stresses but only circumferential stresses.

The helical winding of variable pitch, by virtue of the continuity of the filaments and of the variations of the winding angle, has a variable thickness which increases from zone A1 to zone A2.

In particular, by arranging the turns alongside one another without overlap, in the case of continuous filaments, it follows that the thickness $s_1$ in zone A1 is equal to 0.67 of the thickness $s_2$ in zone A2, and in a general section it follows that:

$$s=s_2 \sin^2 \alpha$$

If the winding is so dimensioned as to balance the stresses in the zone A2, a further winding of the circumferential type becomes necessary, and is indicated by 15 in FIG. 2, which will have a variable thickness, with a maximum in zone A1 and zero thickness in zone A2, so as to balance out the circumferential stresses not resisted by the principal winding.

The portion 14 of composite material extends over the cap 13 as far as a diameter $d_1$, which will depend upon the angle of the filaments in the transition zone between the cap 13 and the cylindrical surface of lining 9 and upon the diameter of the cylindrical body; in the case where said angle is 55°, $d_1$ is appropriately equal to d sin 55°, that is to say $d_1=0.819$ d.

Figure 3:
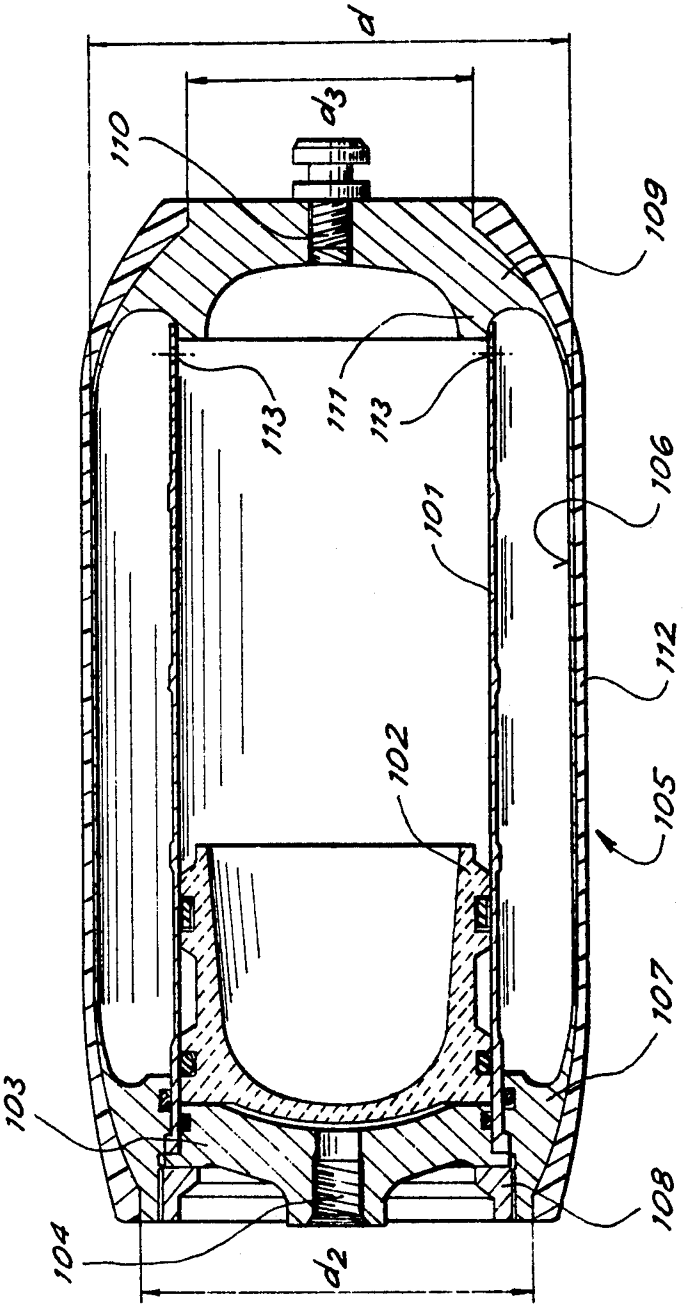
FIG. 3 is an axial view in section of another embodiment of an accumulator according to the invention having an internal lining tube and an external shell of composite material.

Another embodiment of the invention is shown in FIG. 3, which illustrates an accumulator in which the structure called upon to resist the internal pressure is entirely constructed of a composite material. The accumulator comprises a lining tube 101 of steel, inside which a piston 102 slides. At one end, the lining tube 101 is locked to a base 103, equipped with a coupling 104 for the supply of the oil. Outside the lining tube 101 there is a shell 105, arranged to withstand the entire internal pressure.

The shell 105 is composed of an internal core 106 of metallic material, favorably of light alloy, having a thickened zone 107 where it is joined to the lining tube 101 and to the base 103 by means of a threaded ring 108.

At the opposite end 109, there is a further thickened zone, constituting the free head of the accumulator, in which is formed a fitting 110 for the supply of pressurized gas, which can be closed in operation, and an annular raised zone 111 for supporting the free end of the lining tube 101 which is provided with holes 113, which permit communication between the volume inside the lining tube and behind the piston 102 and the volume contained between the external surface of the lining tube and the internal face of the shell 106.

The wall thickness of the cylindrical portion of the shell 106 is fairly small and is not designed to provide an appreciable contribution to the structural strength; the loads are supported by an external envelope 112 of composite material. This enables a consistent saying in the weight of the structure to be achieved, because the steel lining tube 101 can be of small thickness, basically the practicable minimum compatible with the requirements for machining it, since the pressures inside and outside it are equalized. The structure subjected to the internal pressure is constructed of composite material, having a high degree of lightness for the equivalent strength of conventional metallic materials.

Of particular advantage for said purpose, is the use of composite materials employing, as reinforcing fibers, aramide (aromatic polyamide) fibers, known by the commercial name of "Kevlar", which are able to offer a particularly low ratio between weight and tensile strength. A suitable resin is an epoxy resin. The realization of the external shell 106 in composite material is subject to geometrical limitations in respect of the maximum diameter $d_2$ admissible at the end 107 and the minimum diameter $d_3$ admissible at the end 109. With regard to the diameter $d_2$, in the case of a balanced winding with an angle between the fibers and the generatrices of the cylindrical portion of 55°, this diameter is substantially equal to 0.8 d. (Where d is the maximum internal diameter of the composite envelope.)

The diameter $d_3$ may be made less than the diameter $d_2$ by causing the winding of the fibers to depart from the geodetic profile and, in consequence, transferring shear stresses to the fibres themselves.

Having regard to the shear strength of the fibers used, in relation to their tensile strength, a minimum ratio $a=d_3/d_2$ having a value approximately 0.6 can be accepted; said value corresponds to an angle $\alpha$ of approximately 30° in the transition zone between the cap 109 and the cylindrical surface.

The imbalance in the stresses given by the departure of the winding from the geodetic profile is compensated by a secondary winding, of circumferential type, which provides the necessary contribution of strength in the zones in which the prinipal winding follows unfavorable directions.

What is claimed is:

1. A gas-oil pressure accumulator comprising:
   - a cylindrical body having closable ends and at least one of which is formed with a cap, said body defining a cylinder; and
   - a piston slidable in said cylinder and subdividing the interior of said cylinder into a liquid-containing chamber and into a gas-containing chamber adapted to be pressurized, said body being formed of an internal core and a thin metallic material secured to said cap and an envelope of composite material of high-strength fibers impregnated with synthetic resin, said high-strength fibers being provided in a principal layer having a helical arrangement of variable pitch over a cylindrical portion of said body, and a secondary layer of fibers having a circumferential arrangement and a thickness that decreases from a junction zone between said cap and said cylindrical portion to a zone at an end of said body opposite that at which said cap is provided.

2. The accumulator defined in claim 1 wherein said principal layer has fibers including an angle of substantially 55° with a generatrix of said cylindrical portion at said junction zone and an angle close to 90° at said zone at said end of said cylindrical portion opposite that at which said cap is provided.

3. The accumulator defined in claim 2 wherein said envelope extends over said cap to an extent such that it has a minimum diameter where it covers said cap equal to about 0.8 times the diameter of said cylindrical portion.

4. The accumulator defined in claim 2 wherein said fibers are carbon fibers.

* * * * *